(12) United States Patent
Floyd

(10) Patent No.: US 7,350,060 B2
(45) Date of Patent: Mar. 25, 2008

(54) METHOD AND APPARATUS FOR SENDING THREAD-EXECUTION-STATE-SENSITIVE SUPERVISORY COMMANDS TO A SIMULTANEOUS MULTI-THREADED (SMT) PROCESSOR

(75) Inventor: Michael Stephen Floyd, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1014 days.

(21) Appl. No.: 10/422,650

(22) Filed: Apr. 24, 2003

(65) Prior Publication Data

US 2004/0216102 A1   Oct. 28, 2004

(51) Int. Cl.
*H04Q 1/20* (2006.01)
*H04Q 1/30* (2006.01)

(52) U.S. Cl. .................. 712/227; 712/228; 712/229; 710/36; 710/5

(58) Field of Classification Search ................ 712/43, 712/39; 365/200; 710/72
See application file for complete search history.

(56) References Cited

U.S. PATENT DOCUMENTS

| | | | |
|---|---|---|---|
| 5,822,602 A | 10/1998 | Thusoo | |
| 6,115,763 A * | 9/2000 | Douskey et al. | 710/72 |
| 6,175,914 B1 * | 1/2001 | Mann | 712/227 |
| 6,233,373 B1 * | 5/2001 | Askins et al. | 385/12 |
| 6,415,403 B1 * | 7/2002 | Huang et al. | 714/726 |
| 6,549,930 B1 | 4/2003 | Chrysos et al. | |
| 6,567,933 B1 * | 5/2003 | Swoboda et al. | 714/31 |
| 6,847,578 B2 | 1/2005 | Ranganathan | |
| 6,865,701 B1 * | 3/2005 | Youngs et al. | 714/718 |
| 2001/0054057 A1 | 12/2001 | Long et al. | |
| 2002/0163520 A1 | 11/2002 | Hardin et al. | |
| 2002/0194251 A1 | 12/2002 | Richter et al. | |
| 2003/0033509 A1 | 2/2003 | Leibholz et al. | |
| 2004/0054876 A1 | 3/2004 | Grisenthwaite et al. | |
| 2004/0208066 A1 * | 10/2004 | Burky et al. | 365/200 |
| 2006/0037025 A1 | 2/2006 | Janssen et al. | |

OTHER PUBLICATIONS

McCluskey, Logic Design Principles, Prentice Hall, 1986, pp. 437-443.*

(Continued)

*Primary Examiner*—Henry Tsai
*Assistant Examiner*—Cheng-Yuan Tseng
(74) *Attorney, Agent, or Firm*—Mitch Harris, LLC; Andrew M. Harris; Casimer K. Salys

(57) ABSTRACT

A method and apparatus for sending thread-execution-state-sensitive supervisory commands to a simultaneous multi-threaded processor provides a mechanism for sending supervisory commands that must be executed only for live threads. The commands may be sent from a service processor or another primary processor in the system or may be supplied by the processor itself through supervisory software control. Since the state of execution of one or more threads may change dynamically within a processor core, an external processor will not know the thread execution state at the time the command operates. The method and apparatus provide a command set and logic that supports selective execution of particular commands directed at "alive" threads (or threads in some other determinable execution state), whereby the command is performed only on resources and/or execution units depending on the actual state of thread execution when the command operates within the processor.

9 Claims, 3 Drawing Sheets

OTHER PUBLICATIONS

Czajkowski, et al., "Resource Management for Extensible Internet Servers", ACM SIGOPS European Workshop, p. 33-39, 1998.

Bridges, et al., "A CPU Utilization Limit for Massively Parallel MIMD Computers", Frontiers of Massively Parallel Computing, Oct. 19-21, 1992, pp. 83-92.

* cited by examiner

METHOD AND APPARATUS FOR SENDING THREAD-EXECUTION-STATE-SENSITIVE SUPERVISORY COMMANDS TO A SIMULTANEOUS MULTI-THREADED (SMT) PROCESSOR

BACKGROUND OF THE INVENTION

1. Technical Field

The present invention relates generally to processors and computing systems, and more particularly, to a simultaneous multi-threaded (SMT) processor. The present invention also relates to supervisory processor control logic and external supervisory and test ports.

2. Description of the Related Art

Present-day high-speed processors include the capability of simultaneous execution of instructions, speculative execution and loading of instructions and simultaneous operation of various resources within a processor. In particular, it has been found desirable to manage execution of one or more threads within a processor, so that more than one execution thread may use the processor and so that resources more effectively than they are typically used by a single thread.

Present-day computer systems also typically include secondary service processors that are used to initialize and monitor the primary processors within a computer system. Such service processors typically have very powerful control capability with respect to the primary processors to which they are connected of complete control of internal caches, processor core(s) and other logical units within a processor and are typically connected via a test port such as a Joint Test Action Group (JTAG) test port. Although JTAG ports were first developed for boundary-scan manufacturing test applications, use of the JTAG port for external supervisory control of a primary processor by a service processor has been implemented for convenience and simplicity of interconnect.

Simultaneous multi-threaded (SMT) processors provide very efficient use of processor resources, as multiple threads may simultaneously use processor resources. Multiple threads are concurrently executed in an SMT processor so that multiple processor execution units, such as floating point units, fixed point instruction units, load/store units and others can be performing tasks for one (or more depending on the execution units' capabilities) of multiple threads simultaneously.

However, synchronization between thread states that may be changing rapidly within an SMT processor and supervisory commands issued via a test port arrive at processor cores relatively slowly. Therefore, certain service processor controls cannot be readily issued if the execution states of one or more threads may change prior to arrival of the command, as the controls may "crash" the primary processor, causing corruption of data and system errors.

It is therefore desirable to provide a method and apparatus that provide a mechanism for issuing thread-execution-state-sensitive supervisory commands to an SMT processor.

SUMMARY OF THE INVENTION

The objective of providing a mechanism for issuing thread-execution-state-sensitive control commands to an SMT processor through an external control path, which may be the processor test port, is accomplished in a processor control apparatus and method. The method and processor support a protocol having a command field specifying a service command targeting one or more threads having a predetermined execution state. The command field may be an address field of a command, or the command field may be provided in the data supplied with a command. The command field may specify that the commands are to be performed on: all "alive" threads, all threads in any state (either "dead" or "alive"), in addition to permitting specifying a particular thread number and performing the command for the particular thread irrespective of thread state. The processor includes logic for determining whether or not the specified threads are in the predetermined execution state and permit the command action to proceed only for threads currently in the predetermined execution state.

The processor may be capable of both SMT and single-threaded (ST) operating modes, or may be a multi-threaded processor capable of simultaneously executing two or more threads.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF ILLUSTRATIVE EMBODIMENT

Figure 1:
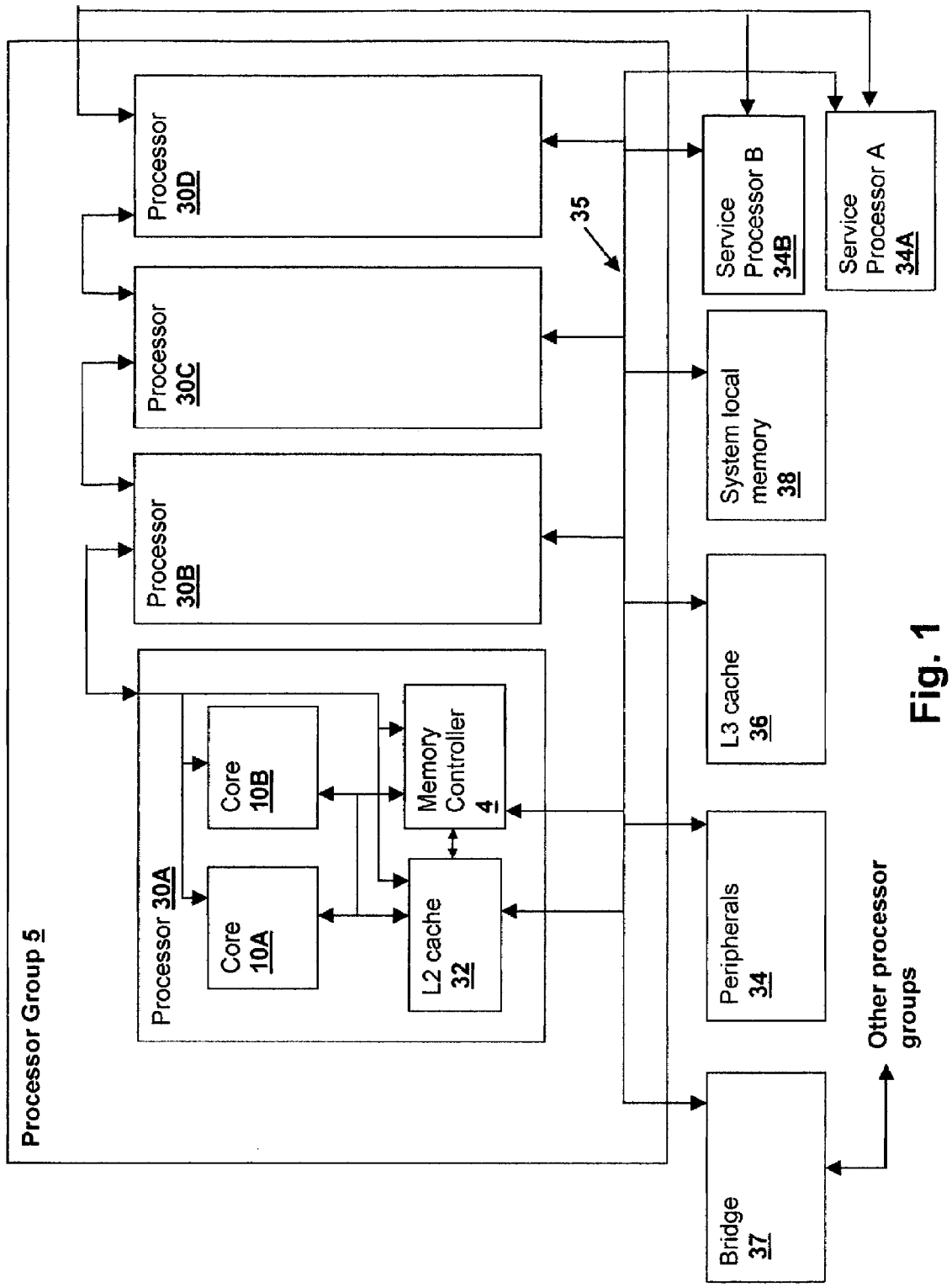
FIG. 1 is a block diagram of a system in accordance with an embodiment of the invention.

With reference now to the figures, and in particular with reference to FIG. 1, there is depicted a block diagram of a system in accordance with an embodiment of the present invention. The system includes a processor group 5 that may be connected to other processor groups via a bridge 37 forming a super-scalar processor. Processor group 5 is connected to an L3 cache unit 36 system local memory 38 and various peripherals 34, as well as to two service processors 34A and 34B. Service processors 34A-B provide fault supervision, start up assistance and test capability to processor group 5 and may have their own interconnect paths to other processor groups as well as connecting all of processors 30A-D.

Within processor group 5 are a plurality of processors 30A-D, each generally fabricated in a single unit and including a plurality of processor cores 10A and 10B coupled to an L2 cache 32 and a memory controller 4. Cores 10A and 10B provide instruction execution and operation on data values for general-purpose processing functions. Bridge 37, as well as other bridges within the system provide communication over wide buses with other processor groups and bus 35 provide connection of processors 30A-D, bridge 37, peripherals 34, L3 cache 36 and system local memory 38. Other global system memory may be coupled external to bridge 37 for symmetrical access by all processor groups.

Processor cores 10A and 10B are simultaneous multi-threaded (SMT) processors capable of concurrent execution of multiple threads. Processor cores 10A and 10B further support a single-threaded operating mode for efficient execution of a single thread when program execution conditions dictate single threaded operation, e.g., when high-priority program execution must be completed by a known time, or when one thread in a multi-threaded processor is known to be idle. Multi-threading introduces some inefficiencies over full-time execution of a single-thread, but overall there is a system efficiency advantage as threads are often idle waiting on other tasks to complete. Therefore transitioning between single-threaded and multi-threaded mode provides an advantage in adapting to one or more of the above-described conditions, and embodiments of the present invention provide supervisory control of threads within such a processor.

When service processor 34A or 34B needs to perform certain supervisory operations within one or more of processors 30A-D, the state of thread execution is critical to proper performance of the command actions. Some commands are "thread-execution-state sensitive" meaning that they can only be issued to (or for) threads that are currently executing. For example, a flush operation cannot be performed on a dead thread, and depending on specific processor design, the flush operation may cause a processor to "crash".

Service processor 34A and 34B are connected to processors 30A-D via a Joint Test Action Group (JTAG) test port interface that has command and logic extensions providing very facile control of processors 30A-D, but the JTAG interface connections generally operate in the range of 2 Mbits/s versus nanosecond level instruction cycle updates within processors 30A-D. Since thread execution state can change very quickly within processors 30-AD, it is not possible for service processors 34A and 34B to "sample" the state of thread execution before sending thread-execution-state-sensitive commands to one or more of processors 30-AD. The present invention provides a mechanism for selectively executing test port commands issued to a processor core within processor group 5 in conformity with the execution state of threads and also in conformity with a field of the command that specifies a thread-execution-state dependency. The selective execution either aborts or temporarily suspends (holds) those commands on threads for which the execution state does not match the specified thread-execution-state. Details of the present invention will be described below with respect to FIG. 3, after a general overview of processor cores 10A and 10B is made. Generally, control paths other than a JTAG test port may be used to issue supervisory commands in conformity with embodiments of the present invention, with the general requirement that the control path is logically different than the instruction path of the processor (even though the same physical bus may be used to send the supervisory commands to control logic within the processor core).

Figure 2:
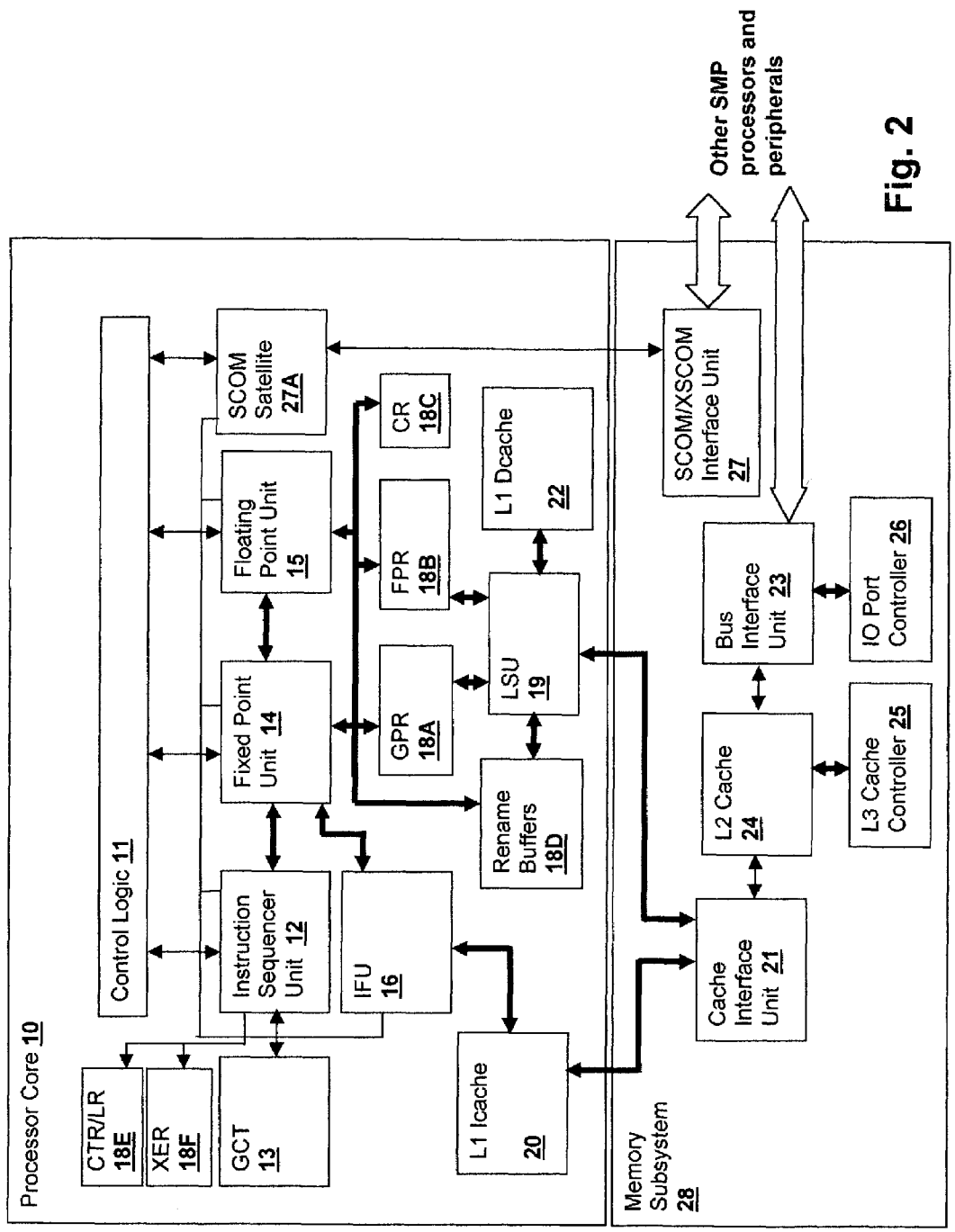
FIG. 2 is a block diagram of a processor core in accordance with an embodiment of the invention.

Referring now to FIG. 2, details of a processor core 10 having features identical to processor cores 10A and 10B is depicted. A bus interface unit 23 within a memory subsystem 28 connects processor core 10 to other SMT processors and peripherals and to 10 ports via 10 port controller 26. Memory subsystem 28 also contains an L2 cache 24 for storing data values and program instructions for transfer to and from an L1 Dcache 22 for storing data values and an L1 Icache 20 for storing program instructions, both connected via a cache interface unit 21. L1 Icache 20 provides loading of instruction streams in conjunction with instruction fetch unit IFU 16, which prefetches instructions and may include speculative loading and branch prediction capabilities. An instruction sequencer unit (ISU) 12 controls sequencing of instructions issued to various internal units such as a fixed point unit (FXU) 14 for executing general operations and a floating point unit (FPU) 15 for executing floating point operations. Global completion tables (GCT) 13 track the instructions issued by ISU 12 via tags until the particular execution unit targeted by the instruction indicates the instructions have completed execution.

Fixed point unit 14 and floating point unit 15 are coupled to various resources such as general-purpose registers (GPR) 18A, floating point registers (FPR) 18B, condition registers (CR) 18C, rename buffers 18D, count registers/link registers (CTR/LR) 18E and exception registers (XER) 18F. GPR 18A and FPR 18B provide data value storage for data values loaded and stored from L1 Dcache 22 by load store unit (LSU) 19. CR 18C stores conditional branching information and rename buffers 18D (which may comprise several rename units associated with the various internal execution units) provides operand and result storage for the execution units. XER 18F stores branch and fixed point exception information and CTR/LR 18E stores branch link information and count information for program branch execution. GPR 18A, FPR 18B, CR 18C, rename buffers 18D, CTR/LR 18E and XER 18F are resources that include some fixed (architected) registers that store information during execution of a program and must be provided as a fixed set for each executing thread, other non-architected registers within the above resources are free for rename use. Control logic 11 is coupled to various execution units and resources within processor core 10, and is used to provide pervasive control of execution units and resources. An SCOM satellite 27A receives commands directed at processor core 10 from external SCOM or XSCOM sources provided through an SCOM/XSCOM Interface unit 27 within memory subsystem 28. SCOM/XSCOM interface unit 27 provides a connection to external service processors 34A-B as well as to other processors in processor group 5.

Within control logic 11, sets of signals are produced that are coupled to all of the above-listed resources and execution units for testing and control of processor core 10. JTAG commands may be loaded from service processors 34A-B or other processors connected to SCOM/XSCOM interface unit 27 that start or stop instruction processing, set modes of operation, flush queues, cause load commands to cache units, clear execution unit pipelines and cause direct injection of commands into execution units. Processor core 10 itself, by the action of low-level software program control logic 11 directly to issue supervisory commands directly to its own execution units. Also within control logic 11 is the above-mentioned mechanism for selectively executing commands that are thread-execution-state sensitive, although the logic for selective execution of commands may be distributed outside of control logic 11 in other embodiments of the present invention (for example, an execution unit may provide logic for selective action in response to an indication provided from control logic 11 or directly from SCOM/XSCOM interface 27).

Figure 3:
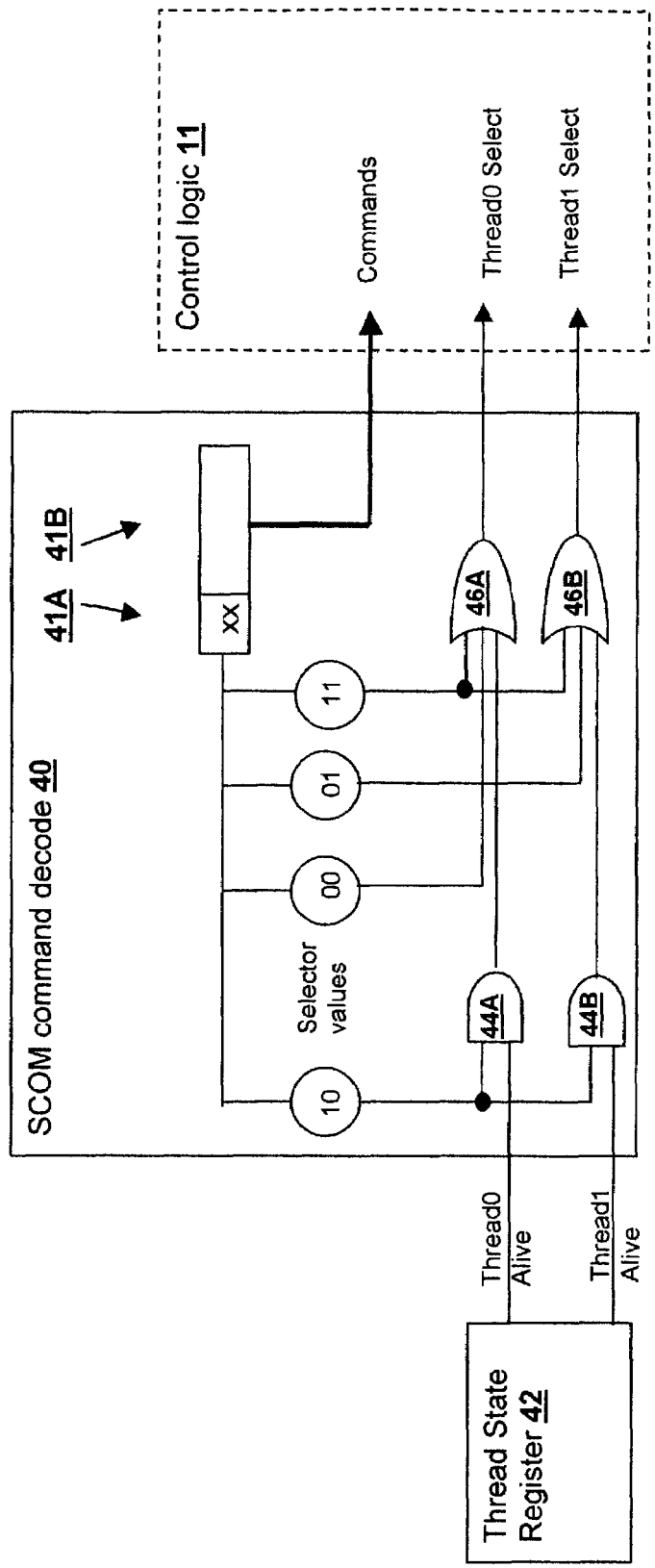
FIG. 3 is a block diagram of details of functional units within processor core 10 of FIG. 2.

Referring now to FIG. 3, details of functional blocks within processor core 10 are depicted. SCOM/XSCOM interface unit 27 receives commands from service processor 34A and/or 34B or other service processors and primary processors in the system that direct operations to and/or return status from execution units and resources within processor core 10. An SCOM/XSCOM command decoder 40 within control logic 11 (which may be alternatively located within SCOM/XSCOM satellite 27A), provides a command word (or alternatively a set of action outputs that are wired to particular execution units and resources depending on the action desired) to control logic 11, for sending to other execution units or resources within processor 10. For example, on an instruction start command, a decode of the command may provide a direct start signal to ISU 12 for the thread that is targeted by the start command. In the present invention, the action outputs of SCOM/XSCOM command decoder 40 are divided into a command field and Thread0 and Thread1 select signals that are used in conjunction with the command field to qualify the application of decoded commands with the thread or threads for which the command is to be applied. The command field is directly received from a command word portion 41B of a command register and the thread selector values are derived from a field 41A that comprises two bits within the address field of the command loaded within the command register.

Logic within SCOM command decode 40 supports a special decode of thread-execution-state dependent commands (which are generally thread-execution-state-sensitive commands, but the present invention extends beyond the use of selective execution for thread-execution-state-sensitive commands) and other commands. Other commands are commands targeting a specific thread or "all thread" commands that are not selectively performed dependent on the thread execution state. Command decode or action signals associated with the other commands may be directly connected to the targeted execution units and/or resources.

In the illustrated embodiment, two bits within the command address field are used to indicate the following actions:
  00-Perform action for thread 0
  01-Perform action for thread 1
  10-Perform action for "alive" threads
  11-Perform action for all threads Selector values other than "10" are used to direct actions irrespective of thread execution state. Selector value 10 is a thread-execution-state dependent command specifier that is combined with a thread state to determine for which threads (if any) to execute the command. Thread-execution-state dependent commands are qualified by logic (depicted herein for the illustrated command decode as logical AND gates 44A and 44B) that disable actions for threads that are not in an execution state specified in the command. Logical AND gates 44A and 44B are shown connected to a thread state register 42 (also generally located within control logic 11, but may be a permanently architected register within one of the above-mentioned storage resources) for qualifying a selector value (10) specifying a command targeting all live threads with the dynamic thread execution state stored in thread state register 42 with a "1" indicating that the associated thread is active. The signal lines output from logical AND gates 44A and 44B are only asserted when the live thread signal and the thread state register value 42 for the associated thread are asserted.

Additional thread-execution-state independent decodes (selector values 00, 01 and 11) supplied by SCOM command decode 40 are combined in logical OR operations with the outputs of logical AND gates 44A-B such that one or both threads may be selected regardless of state. Logical OR gates 46A and 46B each combine the decoded selector value for "11" (all threads) and independently combine the decoded selector values 00 (for Thread0 via logical OR gate 46A) and 01 (for Thread1 via logical OR gate 46B).

In other embodiments where the command decode and thread state qualification is made to generate direct action signals to execution units (rather than a command word and thread select signals as illustrated), many gates are required to qualify the many actions that may be performed on a thread-execution-state dependent basis and to combine the action signals for nonthread execution-state dependent commands. The invention can be further extended to execution states other than "alive" or "dead" in specific processor designs where other thread execution states are supported (for example, partially-dead states where some resources may be allocated to a thread where other resources are not permitted to a thread in that state). Also, the mechanism may qualify commands acting on a certain execution units that are being used by a thread and in that case, the command may be used to specify that no threads are using a particular execution unit.

Control logic 11 may selectively perform a command enabling actions for only dead threads, rather than only live threads as illustrated above. Another variation is implentation of logic to support commands to individual threads, but qualified on "alive" status so that an individual thread may be sent a thread-state-sensitive command.

Control logic 11 may also "hold" action signals or commands until a specific thread execution state, such as cycle states for an alive thread. For example, a command may be sent to execute a particular control command only when an instruction dispatch is not being made for a particular thread. A command field can specify a particular thread and an instruction dispatch cycle negative qualifier field, and the command can be qualified and held until an instruction dispatch cycle is not in progress for the thread. Thus, very complex command sets can be built on a variety of execution state dependencies, all threads specifiers, one thread specifiers (or thread subset specifiers for processors that support execution of more than two threads).

While the invention has been particularly shown and described with reference to the preferred embodiment therof, it will be understood by those skilled in the art that the foregoing and other changes in form, and details may be made therein without departing from the spirit and scope of the invention. and other changes in form, and details may be made therein without departing from the spirit and scope of the invention.

What is claimed is:

1. A method of controlling a processor through an external control path, comprising:
  sending a command through said external control path to a control logic within said processor, wherein said command includes an indicator indicating whether or not said command is thread-execution-state dependent;
  receiving said command at said control logic and determining whether or not said command is thread-execution-state dependent;
  in response to said determining that said command is thread-execution-state dependent, second determining whether or not a state of execution of each of one or more threads implicated by said command matches a predetermined execution state associated with said indicator;
  in response to said determining that said command is thread-execution-state dependent, selectively performing an action in response to said receiving said commands in conformity with a result of said second determining; and
  in response to said determining that said command is not thread-execution-state dependent, performing said command.

2. The method of claim 1, wherein said sending sends said command through a test port of said processor.

3. The method of claim 1, wherein said selectively performing said action performs said command on threads that match said predetermined execution state.

4. The method of claim 1, wherein in response to determining that a state of execution of none of said one or more threads match said predetermined execution state, said selectively performing an action aborts execution of said command.

5. The method of claim 1, wherein in response to determining that a state of execution of at least one of said one or more threads does not match said predetermined execution state, said selectively performing an action aborts execution of said command.

6. The method of claim 1, wherein said predetermined execution state is a state indicating a currently executing thread, and wherein said second determining determines whether or not each of said one or more threads is currently executing.

7. The method of claim 1, wherein said indication is contained within an address field of said command, and wherein said determining whether or not said command is thread-execution-state dependent comprises decoding said indicator from said address field.

8. The method of claim 7, wherein said decoding decodes said indicator to determine whether said indication indicates a non-thread-execution-state dependent command directed at a single thread, a non-thread-execution-state dependent command directed at all threads, or a thread-execution-state dependent command directed at said one or more threads.

9. The method of claim 1, wherein said decoding decodes said indicator to determine whether said indication indicates a non-thread-execution-state dependent command directed at a single thread, a non-thread-execution-state dependent command directed at all threads, or a thread-execution state dependent command directed at all threads.

* * * * *